July 10, 1934.  R. S. SANFORD  1,966,139

BRAKE

Filed Jan. 18, 1928

INVENTOR.
ROY S. SANFORD
BY
M. W. Conkey
ATTORNEY.

Patented July 10, 1934

1,966,139

UNITED STATES PATENT OFFICE 1,966,139

BRAKE

Roy S. Sanford, South Bend, Ind., assignor to Bendix Brake Company, South Bend, Ind., a corporation of Illinois Application January 18, 1928, Serial No. 247,505

1 Claim. (Cl. 188—78)

This invention relates to brakes. An object of the invention is to provide a simple and powerful brake.

An important feature of novelty is in the arrangement of the friction means to be held in any position to which it is shifted, so that the released position is determined by the wiping action of the drum (which is never absolutely cylindrical), thus giving under all conditions an absolute minimum clearance between the friction means and the drum. Preferably the friction means includes a shiftable device of the type which anchors at one end when the drum is turning in one direction and at the other end when the drum is turning in the other direction. In the various arrangements shown in the drawing, this friction device includes a plurality of shoes arranged end to end, and which may be connected by an expansible joint shown in several embodiments and which in itself includes important features of novelty forming part of my invention.

Various other features and desirable structure of the invention include a simple and efficient applying means for the brake, a novel anchoring abutment for the floating friction device, and various other subcombinations which are described below in connection with the devices illustrated in the accompanying drawing, in which.

Figure 1:
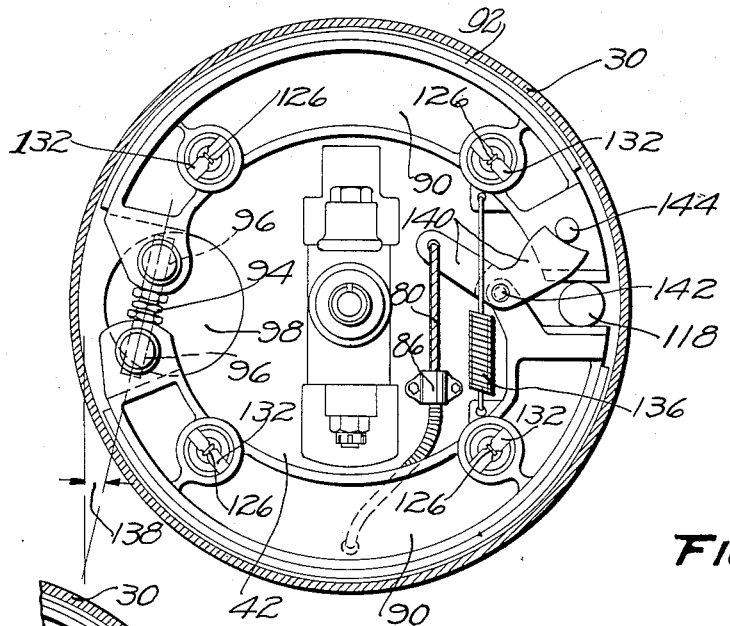
Figure 1 is a vertical sectional view of a brake illustrating the friction elements in side elevation and showing the invention as applied.

Each of the brakes shown includes novel friction means, preferably including a friction device arranged to anchor at one end when the drum is turning in one direction and at the other end when the drum is turning in the other direction. The illustrated form of friction device, which embodies substantial novelty, includes two arcuate rigid brake shoes 90 faced with suitable brake lining 92. As shown, throughout most of its length each of the shoes may be shaped in cross-section something like an I-beam.

The shoes 90, or their equivalents, are preferably connected by a novel floating joint which is expansible to take up for wear of the lining 92, and which in the illustrated embodiment takes the form of a right-and-left threaded screw 94 threaded into cylindrical connectors or pivots 96 mounted in openings formed in bosses and extending transversely of the shoes adjacent their ends. Screws 94 are formed with polygonal portions at their centers, to be embraced by an adjusting wrench inserted through an opening in backing plate 42 provided with a suitable cover 98. This structure forms the subject matter of my divisional application Serial No. 499,683 filed December 3, 1930. The shoes may be connected by a toggle arrangement such as shown in my divisional application Serial No. 499,685 filed December 3, 1930.

One of the brakes may be applied by an operating lever, to which the cable 80 is connected. The operating means forms the subject matter of my divisional application Serial No. 499,681, filed December 3, 1930.

An important feature of the invention relates to the positioning of shoes 90, or equivalent friction means, when the brake is released. Preferably they are held, for example by the novel friction instrumentalities described below, in any position to which they may be moved. Thus when the brake is released, the low spots of the drum (no drum being absolutely cylindrical) wipe the shoes away from the drum to their released positions. These released positions are therefore such as to give the minimum possible clearance which will not cause dragging.

The particular friction instrumentalities illustrated include tensioned coil springs 126 arranged in openings 128 extending transversely of the shoes, and connected at their opposite ends to the backing plate 42 and to washers 130 or cross pins 132 engaging the sides of the shoes opposite the backing plate. Springs 126 may be inclined slightly in a vertical plane, to help in taking the weight of the shoes, or they may have their axes perpendicular to the backing plate. They may urge the shoes against friction washers 134, or directly against the backing plate. In any case, the tension of the springs is great enough to hold the shoes in any position to which they may be shifted. Springs 136, too light to overcome the above-described friction instrumentalities, may be tensioned between the shoes if desired. This particular means for locating the friction element forms the subject matter of my divisional application Serial No. 499,682, filed December 3, 1930.

In Figure 1 the screw 94, or an equivalent connection, is inclined at an acute angle 138 to a tangent to the drum opposite the connection. This serves two purposes: (1) It increases the servo or self-energizing effect of the upper or primary shoe, and (2) it increases the outward or applying pressure on the unanchored or left end of the lower or secondary shoe. As the secondary shoe is forced with very great pressure against the drum at its anchored end, it ordinarily wears much faster at that end than at its unanchored end. By the above-described expedient, the pressure at the unanchored end can be increased enough to equalize the wear. The applying means is in the form of a lever 140 fulcrumed at 142 on the lower shoe, and forked at its end to have wedging engagement with pins 144 extending from opposite sides of the upper shoe.

Figure 2:
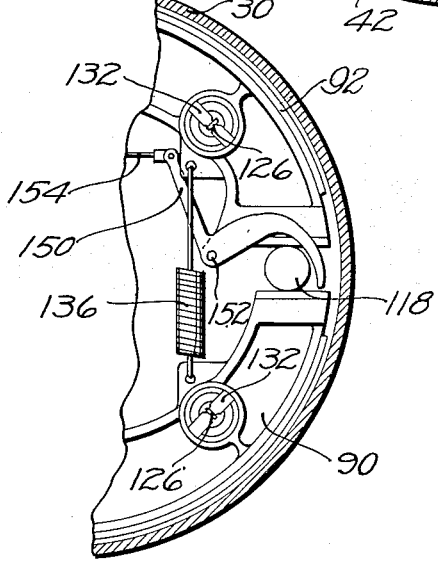
Figure 2 is a vertical sectional view of a fragment of a brake illustrating the modified form of the invention.

The brake shown in Figure 2 includes as an applying device a lever 150 fulcrumed at 152 on the upper shoe and curved around the anchoring abutment 118 to engage the end of the lower shoe. A thrust link 154 operates the lever 150.

Figure 3:
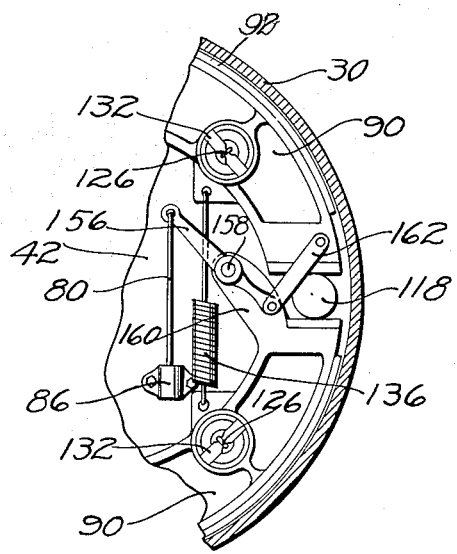
Figure 3 is a vertical sectional view of a fragment illustrating another modified form of the invention.
Figure 4:
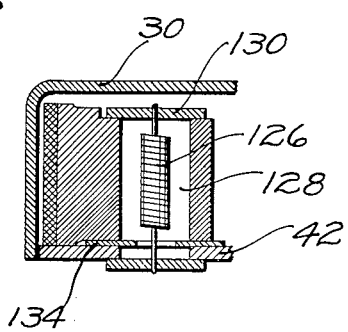
Figure 4 is a vertical sectional view through one of the frictional devices serving to hold the shoes in the released positions.

In Figure 3 the applying device includes a forked lever 156 fulcrumed at 158 on an extension 160 of the lower shoe which may be in the form of an outboard support, and connected by thrust links 162 to the end of the upper shoe.

Operation of the brake shown in Figure 1 is accomplished by applying tension to the cable 80 which in turn rocks the bell crank 140 which is constructed on its opposite end with a cam. Rocking of this bell crank tends to spread apart the pin 144 with which the cam end engages and the fulcrum upon which the bell crank pivots. Since the pin and fulcrum are upon adjacent ends of two different shoes, spreading and braking action results. In the modification shown in Figure 2, one end of the bell crank lever acts directly upon the end of one shoe and is pivoted upon the end of the adjacent shoe and thus when actuated spreads the shoes into engagement with the drum. The operation of the construction shown in Figure 3 is similar to that of Figures 1 and 2 except that a short link is provided between the end of the lever and the adjacent brake shoe. Other operating levers such as shown in my divisional application Serial No. 499,684, filed December 3, 1930, may be employed with good effect.

While several different constructions have been described in detail, it is not my intention to limit the scope of the invention to those particular constructions, or otherwise than by the terms of the appended claim.

I claim:

A brake comprising a drum and a backing plate having friction means mounted thereon, said drum and backing plate defining a chamber, said friction means having adjacent separable ends, an anchor carried by said backing plate and arranged between said separable ends, a floating applying lever acting on said ends and arranged to clear said anchor, a conduit extending through the backing plate and secured thereto within the chamber, the other end of said conduit being anchored independently of said backing plate exteriorly of said chamber, and a tension element passing through said conduit into said chamber and having its portion within the drum arranged as a straight longitudinally-movable free section connected to said floating lever.

ROY S. SANFORD.